(12) United States Patent
Liu

(10) Patent No.: US 12,033,594 B2
(45) Date of Patent: Jul. 9, 2024

(54) BACKLIGHT DRIVING CIRCUIT AND DISPLAY DEVICE

(71) Applicant: TCL CHINA STAR OPTOELECTRONICS TECHNOLOGY CO., LTD., Guangdong (CN)

(72) Inventor: Jinfeng Liu, Guangdong (CN)

(73) Assignee: TCL China Star Optoelectronics Technology Co., Ltd., Guandong (CN)

( * ) Notice: Subject to any disclaimer, the term of this patent is extended or adjusted under 35 U.S.C. 154(b) by 0 days.

(21) Appl. No.: 17/622,809

(22) PCT Filed: Dec. 16, 2021

(86) PCT No.: PCT/CN2021/138945
§ 371 (c)(1),
(2) Date: Jun. 1, 2023

(87) PCT Pub. No.: WO2023/092749
PCT Pub. Date: Jun. 1, 2023

(65) Prior Publication Data
US 2024/0029676 A1    Jan. 25, 2024

(30) Foreign Application Priority Data
Nov. 29, 2021 (CN) .......................... 202111473420.8

(51) Int. Cl.
G09G 3/36 (2006.01)
G09G 3/34 (2006.01)

(52) U.S. Cl.
CPC ............. *G09G 3/36* (2013.01); *G09G 3/3406* (2013.01); *G09G 2320/0626* (2013.01); *G09G 2330/021* (2013.01)

(58) Field of Classification Search
None
See application file for complete search history.

(56) References Cited

U.S. PATENT DOCUMENTS 7,015,654 B1    3/2006 Kuhlmann et al.
7,852,010 B2 *  12/2010 Negley ................. H05B 45/46
                                            315/192

(Continued)

FOREIGN PATENT DOCUMENTS

CN    102141202 A    8/2011
CN    102610207 A    7/2012

(Continued)

OTHER PUBLICATIONS

International Search Report in International application No. PCT/CN2021/138945, mailed on Aug. 25, 2022.

(Continued)

*Primary Examiner* — Matthew Yeung
(74) *Attorney, Agent, or Firm* — PV IP PC; Wei Te Chung; Zhigang Ma

(57) ABSTRACT

The present application provides a backlight driving circuit and a display device. The backlight driving circuit includes a light-emitting module, a light-emitting control module, and a constant current source. Wherein the light-emitting module includes a first light-emitting unit for receiving a first power supply signal and a second light-emitting unit for receiving a second power supply signal. A first connection terminal of the light-emitting control module is electrically connected to the first light-emitting unit, and a second connection terminal is electrically connected to the second light-emitting unit to control the first light-emitting unit and the second light-emitting unit to emit light in a time-division manner.

20 Claims, 7 Drawing Sheets

(56) References Cited

U.S. PATENT DOCUMENTS

| | | | | |
|---|---|---|---|---|
| 8,074,397 B2* | 12/2011 | Yoneda | ............... | A01G 7/045 |
| | | | | 47/1.01 R |
| 8,841,856 B1* | 9/2014 | Beasley | ............... | H05B 45/44 |
| | | | | 315/253 |
| 2005/0276046 A1* | 12/2005 | Oppor | ............... | F21V 7/0008 |
| | | | | 362/249.01 |
| 2008/0231204 A1* | 9/2008 | Praiswater | ............ | H05B 45/37 |
| | | | | 315/192 |
| 2009/0079363 A1* | 3/2009 | Ghoman | ............... | H05B 45/32 |
| | | | | 315/294 |
| 2009/0201669 A1* | 8/2009 | Hamada | ............ | G02F 1/133603 |
| | | | | 345/82 |
| 2011/0089860 A1 | 4/2011 | Kuo et al. | | |

FOREIGN PATENT DOCUMENTS

| | | |
|---|---|---|
| CN | 102665328 A | 9/2012 |
| CN | 202502717 U | 10/2012 |
| CN | 103280203 A | 9/2013 |
| CN | 203761617 U | 8/2014 |
| CN | 105530728 A | 4/2016 |
| CN | 107134250 A | 9/2017 |
| CN | 109166532 A | 1/2019 |
| CN | 109637461 A | 4/2019 |
| CN | 111627383 A | 9/2020 |
| CN | 111653230 A | 9/2020 |
| CN | 112233625 A | 1/2021 |
| CN | 113012627 A | 6/2021 |
| CN | 213547894 U | 6/2021 |
| CN | 113178166 A | 7/2021 |
| JP | 2008124284 A | 5/2008 |
| JP | 2015226027 A | 12/2015 |
| WO | 2021174805 A1 | 9/2021 |

OTHER PUBLICATIONS

Written Opinion of the International Search Authority in International application No. PCT/CN2021/138945, mailed on Aug. 25, 2022.

Chinese Office Action issued in corresponding Chinese Patent Application No. 202111473420.8 dated Aug. 22, 2022, pp. 1-6.

* cited by examiner

BACKLIGHT DRIVING CIRCUIT AND DISPLAY DEVICE

BACKGROUND OF DISCLOSURE

Field of Disclosure

The present disclosure relates to a field of display technology, in particular to a backlight driving circuit and a display device.

Description of Prior Art

Liquid crystal displays (LCDs) and organic light-emitting diodes (OLEDs) are mainstreams of current display technologies. Wherein, OLED display screens are widely used in electronic products such as mobile phones, televisions, etc. In recent years, the industry has proposed a concept of mini light-emitting diode (Mini-LED) display. With higher demand of consumers for image quality of television display, the Mini-LED technology has received extensive attention.

The Mini-LED is mostly applied to a backlight portion of a television (TV) and a fine control of a very small partition can be realized by a driving system, so as to achieve a display effect comparable to that of the OLEDs. Since a LED is a current device and brightness is current dependent, a constant current source is required inside a LED driving chip to ensure a constant current. In the prior art, a constant current source exists in a backlight driving circuit for driving each light-emitting unit, resulting in a complicated design of the backlight driving circuit and an increased production cost.

SUMMARY OF DISCLOSURE

The present disclosure provides a backlight driving circuit and a display device, in order to solve a technical problem that a constant current source exists in a backlight driving circuit for driving each light-emitting unit, resulting in a complicated design of the backlight driving circuit and an increased production cost.

The present disclosure provides a backlight driving circuit, comprising:
  a light-emitting module comprising a first light-emitting unit and a second light-emitting unit, wherein the first light-emitting unit is connected to a first power supply signal, and the second light-emitting unit is connected to a second power supply signal;
  a light-emitting control module, wherein the light-emitting control module is connected to a control signal, the first power supply signal, and the second power supply signal, the light-emitting control module has a first connection terminal and a second connection terminal, the first connection terminal is electrically connected to the first light-emitting unit, the second connection terminal is electrically connected to the second light-emitting unit, and the light-emitting control module is configured to control the first light-emitting unit and the second light-emitting unit to emit light in a time-division manner under control of the control signal, the first power supply signal, and the second power supply signal; and
  a constant current source electrically connected to the light-emitting control module, wherein the constant current source is configured to control a constant current flowing through the light-emitting module.

Alternatively, in some embodiments of the present disclosure, the light-emitting control module comprises a first light-emitting control unit and a second light-emitting control unit;
  the first light-emitting control unit is connected to the control signal and the second power supply signal, and is electrically connected to the first connection terminal and the constant current source, and the first light-emitting unit is configured to control the first light-emitting unit to emit light under control of the control signal and the second power supply signal; and
  the second light-emitting control unit is connected to the control signal and the first power supply signal, and is electrically connected to the second connection terminal and the constant current source, and the second light-emitting unit is configured to control the second light-emitting unit to emit light under control of the control signal and the first power supply signal.

Alternatively, in some embodiments of the present disclosure, the first light-emitting control unit comprises a first transistor and a second transistor, a gate of the first transistor and a gate of the second transistor are connected to the control signal, one of a source and a drain of the first transistor is electrically connected to the first connection terminal, another one of the source and the drain of the first transistor is electrically connected to a first terminal of the constant current source, one of a source and a drain of the second transistor is electrically connected to a second terminal of the constant current source, and another one of the source and the drain of the second transistor is connected to the second power supply signal.

Alternatively, in some embodiments of the present disclosure, the second light-emitting control unit comprises a third transistor and a fourth transistor, both a gate of the third transistor and a gate of the fourth transistor are connected to the control signal, one of a source and a drain of the third transistor is electrically connected to the first terminal of the constant current source, another one of the source and the drain of the third transistor is electrically connected to the second connection terminal, one of a source and a drain of the fourth transistor is connected to the first power supply signal, and another one of the source and the drain of the fourth transistor is electrically connected to the second terminal of the constant current source.

Alternatively, in some embodiments of the present disclosure, the first transistor and the second transistor are P-type transistors, and the third transistor and the fourth transistor are N-type transistors; or the first transistor and the second transistor are N-type transistors, and the third transistor and the fourth transistor are P-type transistors.

Alternatively, in some embodiments of the present disclosure, the control signal comprises a first control signal and a second control signal; and
  the first light-emitting unit is connected to the first control signal, and the second light-emitting unit is connected to the second control signal.

Alternatively, in some embodiments of the present disclosure, the first transistor, the second transistor, the third transistor, and the fourth transistor are transistors of a same type.

Alternatively, in some embodiments of the present disclosure, the first light-emitting unit comprises a plurality of first light-emitting devices arranged in series or in parallel; and the second light-emitting unit comprises a plurality of second light-emitting devices arranged in series or in parallel.

Alternatively, in some embodiments of the present disclosure, the backlight driving circuit comprises a light emitting diode (LED) driving chip, and both the light-emitting control module and the constant current source are integrally disposed within the LED driving chip.

Alternatively, in some embodiments of the present disclosure, a potential of the first power supply signal is greater than a potential of the second power supply signal.

Accordingly, the present disclosure further provides a display device, comprising a backlight module and a display panel, wherein the display panel comprises an array substrate, a color film substrate, and a liquid crystal layer disposed between the array substrate and the color film substrate, the backlight module is disposed on a side of the array substrate away from the liquid crystal layer, the backlight module comprises a backlight driving circuit, and the backlight driving circuit comprises:

a light-emitting module comprising a first light-emitting unit and a second light-emitting unit, wherein the first light-emitting unit is connected to a first power supply signal, and the second light-emitting unit is connected to a second power supply signal;

a light-emitting control module, wherein the light-emitting control module is connected to a control signal, the first power supply signal, and the second power supply signal, the light-emitting control module has a first connection terminal and a second connection terminal, the first connection terminal is electrically connected to the first light-emitting unit, the second connection terminal is electrically connected to the second light-emitting unit, and the light-emitting control module is configured to control the first light-emitting unit and the second light-emitting unit to emit light in a time-division manner under control of the control signal, the first power supply signal, and the second power supply signal; and a constant current source electrically connected to the light-emitting control module, wherein the constant current source is configured to control a constant current flowing through the light-emitting module.

Alternatively, in some embodiments of the present disclosure, the backlight module comprises a plurality of light-emitting units arranged in an array, each row of the light-emitting units correspond to a plurality of rows of liquid crystals in the liquid crystal layer, and when the plurality of rows of liquid crystals in the liquid crystal layer are deflected row by row and after the deflection is stable, a corresponding row of light-emitting units in the backlight module emit light.

Alternatively, in some embodiments of the present disclosure, the backlight driving circuit is configured to drive two adjacent light-emitting units located in adjacent rows to emit light.

Alternatively, in some embodiments of the present disclosure, the light-emitting control module comprises a first light-emitting control unit and a second light-emitting control unit;

the first light-emitting control unit is connected to the control signal and the second power supply signal, and is electrically connected to the first connection terminal and the constant current source, and the first light-emitting unit is configured to control the first light-emitting unit to emit light under control of the control signal and the second power supply signal; and the second light-emitting control unit is connected to the control signal and the first power supply signal, and is electrically connected to the second connection terminal and the constant current source, and the second light-emitting unit is configured to control the second light-emitting unit to emit light under control of the control signal and the first power supply signal.

Alternatively, in some embodiments of the present disclosure, the first light-emitting control unit comprises a first transistor and a second transistor, a gate of the first transistor and a gate of the second transistor are connected to the control signal, one of a source and a drain of the first transistor is electrically connected to the first connection terminal, another one of the source and the drain of the first transistor is electrically connected to a first terminal of the constant current source, one of a source and a drain of the second transistor is electrically connected to a second terminal of the constant current source, and another one of the source and the drain of the second transistor is connected to the second power supply signal.

Alternatively, in some embodiments of the present disclosure, the second light-emitting control unit comprises a third transistor and a fourth transistor, both a gate of the third transistor and a gate of the fourth transistor are connected to the control signal, one of a source and a drain of the third transistor is electrically connected to the first terminal of the constant current source, another one of the source and the drain of the third transistor is electrically connected to the second connection terminal, one of a source and a drain of the fourth transistor is connected to the first power supply signal, and another one of the source and the drain of the fourth transistor is electrically connected to the second terminal of the constant current source.

Alternatively, in some embodiments of the present disclosure, the first transistor and the second transistor are P-type transistors, and the third transistor and the fourth transistor are N-type transistors; or the first transistor and the second transistor are N-type transistors, and the third transistor and the fourth transistor are P-type transistors.

Alternatively, in some embodiments of the present disclosure, the control signal comprises a first control signal and a second control signal; and the first light-emitting unit is connected to the first control signal, and the second light-emitting unit is connected to the second control signal.

Alternatively, in some embodiments of the present disclosure, the first transistor, the second transistor, the third transistor, and the fourth transistor are transistors of a same type.

Alternatively, in some embodiments of the present disclosure, the backlight driving circuit comprises a light emitting diode (LED) driving chip, and both the light-emitting control module and the constant current source are integrally disposed within the LED driving chip.

The present disclosure provides a backlight driving circuit and a display device. The backlight driving circuit comprises the light-emitting module, the light-emitting control module, and the constant current source. Wherein the light-emitting module comprises the first light-emitting unit for receiving the first power supply signal and the second light-emitting unit for receiving the second power supply signal. The first connection terminal of the light-emitting control module is electrically connected to the first light-emitting unit, and the second connection terminal of the light-emitting control is electrically connected to the second light-emitting unit. The light-emitting control module is configured to control the first light-emitting unit and the second light-emitting unit to emit light in a time-division manner based on the control signal, the first power supply signal, and the second power supply signal. The present disclosure designs a novel backlight driving circuit to control the first light-emitting unit and the second light-emitting unit to emit light in a light-division manner. Therefore, the first light-emitting unit and the second light-emitting unit can share a same constant current source, which simplifies a structure of the backlight driving circuit, and reduces a production cost.

DESCRIPTION OF DRAWINGS

In order to more clearly explain technical solutions in embodiments of the present disclosure, the following will briefly introduce drawings required in the description of the embodiments. Obviously, the drawings in the following description are only some embodiments of the present disclosure. For those skilled in the art, without paying any creative work, other drawings can be obtained based on these drawings.

DETAILED DESCRIPTION OF EMBODIMENTS

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within protection scope of the present disclosure.

In the description of the present disclosure, it is to be understood that terms "first", "second" are for illustrative purposes only and are not to be construed as indicating or imposing a relative importance or implicitly indicating the number of technical features indicated. Thus, a feature that limited by "first", "second" may expressly or implicitly include at least one of the features, and therefore cannot be understood as a limitation of the present disclosure.

The present disclosure provides a backlight driving circuit and a display device, which will be described in detail below. It should be noted that an order of description of the following embodiments is not a limitation on a preferred order of the embodiments of the present disclosure.

Figure 1:
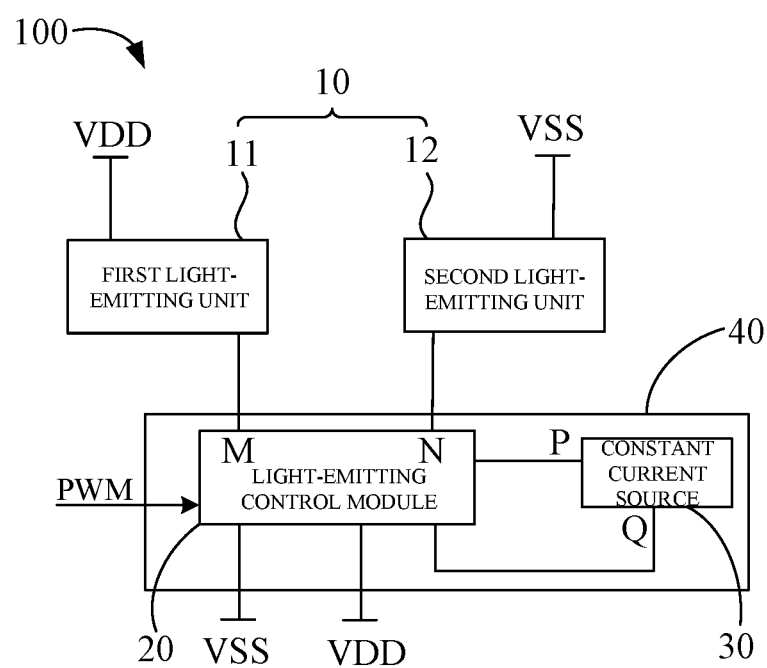
FIG. 1 is a first schematic structural diagram of a backlight driving circuit according to the present disclosure.

Referring to FIG. 1, FIG. 1 is a schematic structural diagram of a backlight driving circuit according to the present disclosure. In the present disclosure, the backlight driving circuit 100 comprises a light-emitting module 10, a light-emitting control module 20, and a constant current source 30.

The light-emitting module 10 comprises a first light-emitting unit 11 and a second light-emitting unit 12. The first light-emitting unit 11 is connected to a first power supply signal VDD. The second light-emitting unit 12 is connected to a second power supply signal VSS.

The light-emitting control module 20 is connected to a control signal PWM, the first power supply signal VDD, and the second power supply signal VSS. The light-emitting control module 20 has a first connection terminal M and a second connection terminal N. The first connection terminal M is electrically connected to the first light-emitting unit 11. The second connection terminal N is electrically connected to the second light-emitting unit 12. The light-emitting control module 20 is configured to control the first light-emitting unit 11 and the second light-emitting unit 12 to emit light in a time-division manner under control of the control signal PWM, the first power supply signal VDD, and the second power supply signal VSS.

The constant current source 30 is electrically connected to the light-emitting control module 20. The constant current source 30 is configured to control a constant current flow through the light-emitting module 10. A current output from the constant current source 30 is constant and does not vary with a load when the load is allowed. It should be noted that a structure and function of the constant current source 30 are well known to those skilled in the art and will not be described herein.

A novel backlight driving circuit 100 is designed in the present disclosure. In the backlight driving circuit 100, the first light-emitting unit 11 and the second light-emitting unit 12 are controlled to emit light at different periods under control of the light-emitting control module 20. Since the first light-emitting unit 11 and the second light-emitting unit 12 emit light in a time-division manner, the first light-emitting unit 11 and the second light-emitting unit 12 may share a same constant current source 30, which simplifies a circuit configuration of the backlight driving circuit 100 and reduces production cost.

In embodiments of the present disclosure, a duty ratio of the control signal PWM can be adjusted by pulse width modulation, and emission times of the first light-emitting unit 11 and the second light-emitting unit 12 can be controlled, thereby controlling display brightness.

In embodiments of the present disclosure, the backlight driving circuit 100 comprises an LED driving chip 40. Both the light-emitting control module 20 and the constant current source 30 are integrally disposed within the LED driving chip 40. Each LED driving chip 40 may be used to drive two light-emitting units, i.e., the first light-emitting unit 11 and the second light-emitting unit 12. Thus, an internal architecture of the LED drive chip 40 is simplified.

Figure 2:
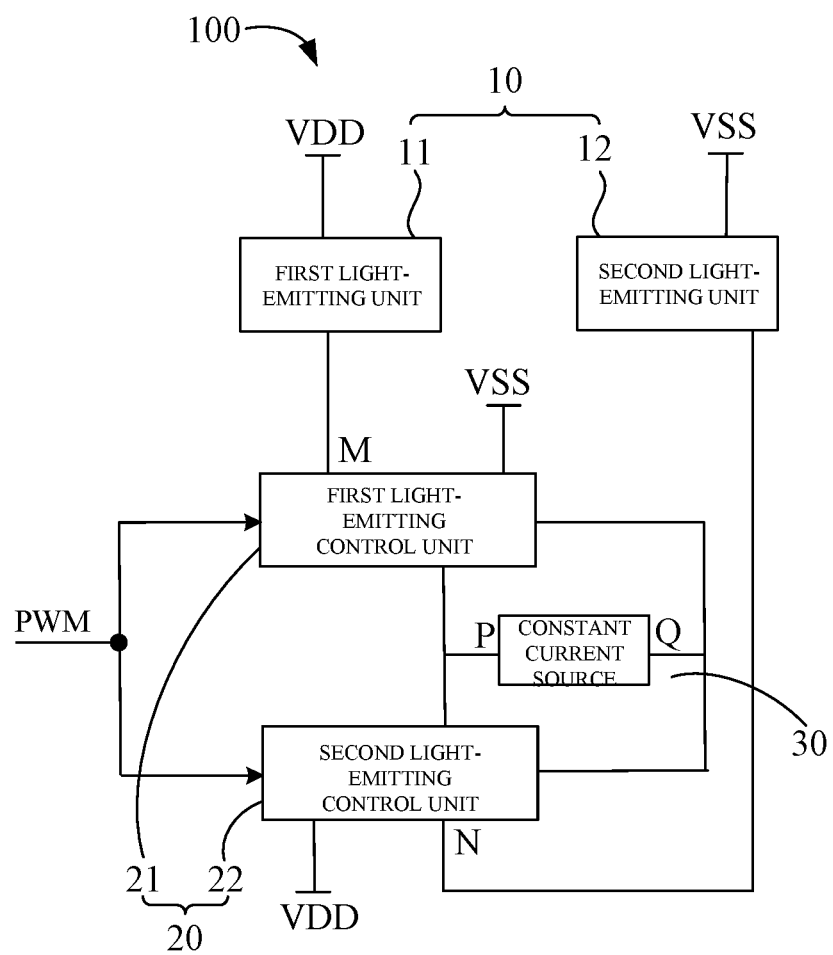
FIG. 2 is a second schematic structural diagram of a backlight driving circuit according to the present disclosure.

Referring to FIG. 2, FIG. 2 is a schematic structural diagram of a second structure of a backlight driving circuit according to the present disclosure. In the present disclosure, the light-emitting control module 20 comprises a first light-emitting control unit 21 and a second light-emitting control unit 22.

Referring to FIGS. 1 and 2, the first light-emitting control unit 21 is connected to the control signal PWM and the second power supply signal VSS. The first light-emitting control unit 21 is electrically connected to the first connection terminal M, a first terminal P and a second terminal Q of the constant current source 30. The first light-emitting unit 11 is configured to control the first light-emitting unit 11 to emit light under control of the control signal PWM and the second power supply signal VSS. The second light-emitting control unit 22 is connected to the control signal PWM and the first power supply signal VDD. The second light-emitting control unit 22 is electrically connected to the second connection terminal N, the first terminal P and the second terminal Q of the constant current source 30. The second light-emitting unit 12 is configured to control the second light-emitting unit 12 to emit light under control of the control signal PWM and the first power supply signal VDD. When the first light-emitting unit 11 emits light, a current flows from the first terminal P to the second terminal Q of the constant current source 30. When the second light-emitting unit 12 emits light, a current flows from the second terminal Q to the first terminal P of the constant current source 30.

In the present disclosure, the first light-emitting control unit 21 and the second light-emitting control unit 22 are designed in the light-emitting control module 20. Light is emitted by controlling a path between the first light-emitting unit 11 and the constant current source 30 by the first light-emitting control unit 21. In addition, light is emitted by controlling a path between the second light-emitting unit 12 and the constant current source 30 by the second light-emitting control unit 22. As a result, the first light-emitting unit 11 and the second light-emitting unit 12 share a same constant current source, thereby simplifying the circuit configuration of the backlight driving circuit 100 and reducing the production cost.

Figure 3:
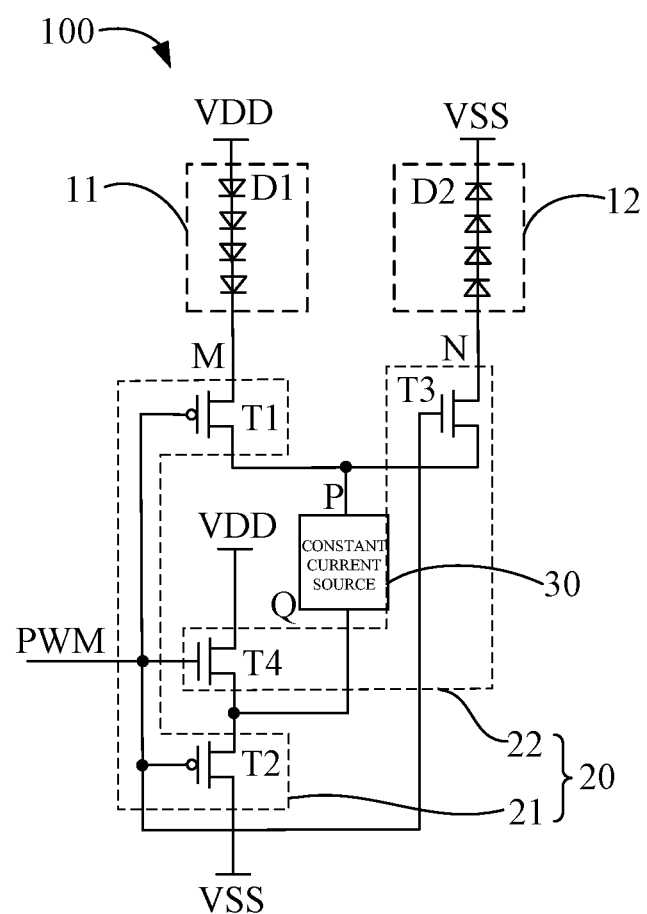
FIG. 3 is a schematic diagram of a first circuit of a backlight driving circuit according to the present disclosure.

Referring to FIG. 3, FIG. 3 is a schematic diagram of a first circuit of a backlight driving circuit according to the present disclosure. In the embodiment of the present disclosure, the first light-emitting control unit 21 comprises a first transistor T1 and a second transistor T2. A gate of the first transistor T1 and a gate of the second transistor T2 are both connected to the control signal PWM. One of a source and a drain of the first transistor T1 is electrically connected to the first connection terminal M. Another one of the source and the drain of the first transistor T1 is electrically connected to the first terminal P of the constant current source 30. One of a source and a drain of the second transistor T2 is electrically connected to the second terminal Q of the constant current source 30. Another one of the source and the drain of the second transistor T2 is connected to the second power supply signal VSS.

Further, in the embodiment of the present disclosure, the second light-emitting control unit 22 comprises a third transistor T3 and a fourth transistor T4. A gate of the third transistor T3 and a gate of the fourth transistor T4 are both connected to the control signal PWM. One of a source and a drain of the third transistor T3 is electrically connected to the first terminal P of the constant current source 30. Another one of the source and the drain of the third transistor T3 is electrically connected to the second connection terminal N. One of a source and a drain of the fourth transistor T4 is connected to the first power supply signal VDD. Another one of the source and the drain of the fourth transistor T4 is electrically connected to the second terminal Q of the constant current source 30.

The backlight driving circuit 100 provided in the embodiment of the present disclosure uses a structure of four transistors and one constant current source 30 to control the first light-emitting unit 11 and the second light-emitting unit 12 respectively, and thus fewer elements are used, the structure is simple and stable, and the cost is saved.

In the embodiment of the present disclosure, the first transistor T1, the second transistor T2, the third transistor T3, and the fourth transistor T4 may be one or more of low-temperature polysilicon thin film transistors, oxide semiconductor thin film transistors, or amorphous silicon thin film transistors. In addition, the transistors used in the present disclosure may be thin film transistors or field effect transistors or other devices having same characteristics. Since sources and drains of the transistors used herein are symmetrical, the sources and drains thereof are interchangeable.

The transistors used in the present disclosure may include two types of P-type transistors and/or N-type transistors. The P-type transistor is turned on when a gate is at a low level and turned off when the gate is at a high level. The N-type transistor is turned on when a gate is at a high level and turned off when the gate is at a low level. The types of the first transistor T1, the second transistor T2, the third transistor T3, and the fourth transistor T4 may be set according to specific configuration of a circuit.

In some embodiments of the present disclosure, both the first power supply signal VDD and the second power supply signal VSS are used to output a preset voltage value. Further, in the embodiment of the present disclosure, a potential of the first power supply signal VDD is greater than a potential of the second power supply signal VSS. Specifically, the potential of the second power supply signal VSS may be a potential of a ground terminal. Of course, it will be understood that the potential of the second power supply signal VSS may be other.

In the present disclosure, the first light-emitting unit 11 comprises at least one first light-emitting device D1. The second light-emitting unit 12 comprises at least one second light-emitting device D2. Each of the first light-emitting device D1 and the second light-emitting device D2 may be one of a mini light-emitting diode, a micro light-emitting diode, or an organic light-emitting diode.

When the potential of the first power supply signal VDD is greater than the potential of the second power supply signal VSS, an anode of the first light-emitting device D1 is electrically connected to the first power supply signal VDD. A cathode of the first light-emitting device D1 is electrically connected to the first connection terminal M. Similarly, when the potential of the first power supply signal VDD is greater than the potential of the second power supply signal VSS, a cathode of the second light-emitting device D2 is electrically connected to the second power supply signal VSS. An anode of the second light-emitting device D2 is electrically connected to the second connection terminal N.

When the first light-emitting unit 11 comprises more than two first light-emitting devices D1, in some embodiments, a plurality of first light-emitting devices D1 may be disposed in series, as shown in FIG. 3. In other embodiments, the plurality of first light-emitting devices D1 may also be disposed in parallel. When the second light-emitting unit 12 comprises more than two second light-emitting devices D2, in some embodiments, a plurality of second light-emitting devices D2 may be disposed in series, as shown in FIG. 3. In other embodiments, a plurality of second light-emitting devices D2 may also be disposed in parallel.

In the embodiment of the present disclosure, the first transistor T1 and the second transistor T2 are P-type transistors. The third transistor T3 and the fourth transistor T4 are N-type transistors. Alternatively, the first transistor T1 and the second transistor T2 are N-type transistors. The third transistor T3 and the fourth transistor T4 are P-type transistors. Thus, the first light-emitting control unit 21 and the second light-emitting control unit 22 can operate in a time-division manner under a same control signal PWM, thereby further simplifying the circuit configuration of the backlight driving circuit 100.

Please continue to refer to FIG. 3, in the embodiment of the present disclosure, a driving control timing of the backlight driving circuit 100 comprises a first light-emitting stage and a second light-emitting stage. In the embodiment of the present disclosure, taking the first transistor T1 and the second transistor T2 being P-type transistors, and the third transistor T3 and the fourth transistor T4 being N-type transistors as an example, however, it cannot be considered as a limitation on the present disclosure.

Figure 4:
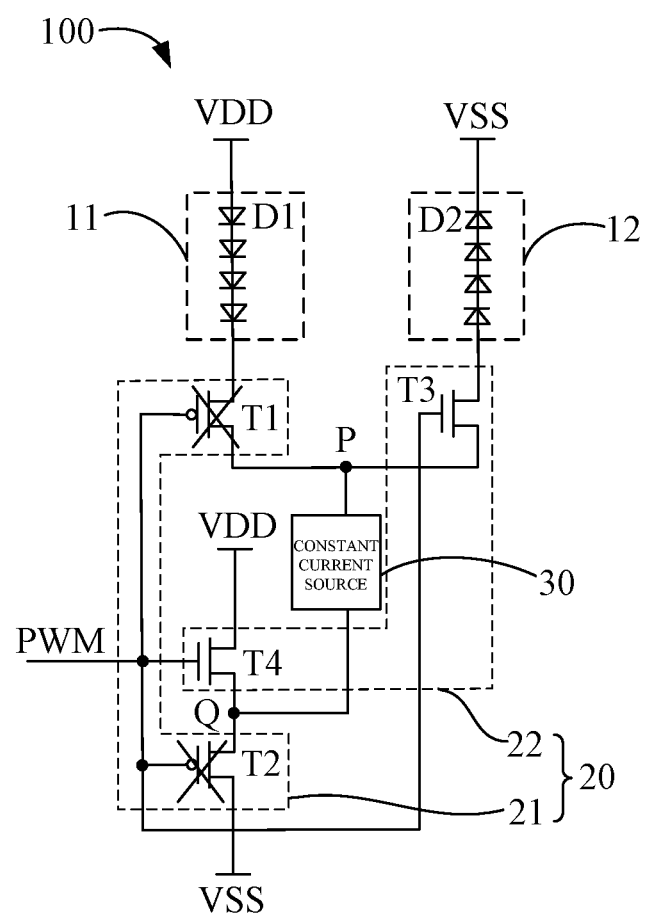
FIG. 4 is a schematic diagram of a path of the backlight driving circuit shown in FIG. 3 in a first light-emitting stage.

Specifically, referring to FIG. 4, FIG. 4 is a schematic diagram of a path of the backlight driving circuit shown in FIG. 3 in the first light-emitting stage. In the first light-emitting stage, the control signal PWM is a high level signal, the first transistor T1 and the second transistor T2 are turned off, and the first light-emitting unit 11 does not emit light. At this time, the third transistor T3 and the fourth transistor T4 are turned on. The first power supply signal VDD, the fourth transistor T4, the constant current source 30, the third transistor T3, the second light-emitting unit 12, and the second power supply signal VSS form a light-emitting path. The second light-emitting unit 12 normally emits light. At this time, an emission time of the second light-emitting unit 12 can be controlled by modulating a duty ratio of the control signal PWM.

Figure 5:
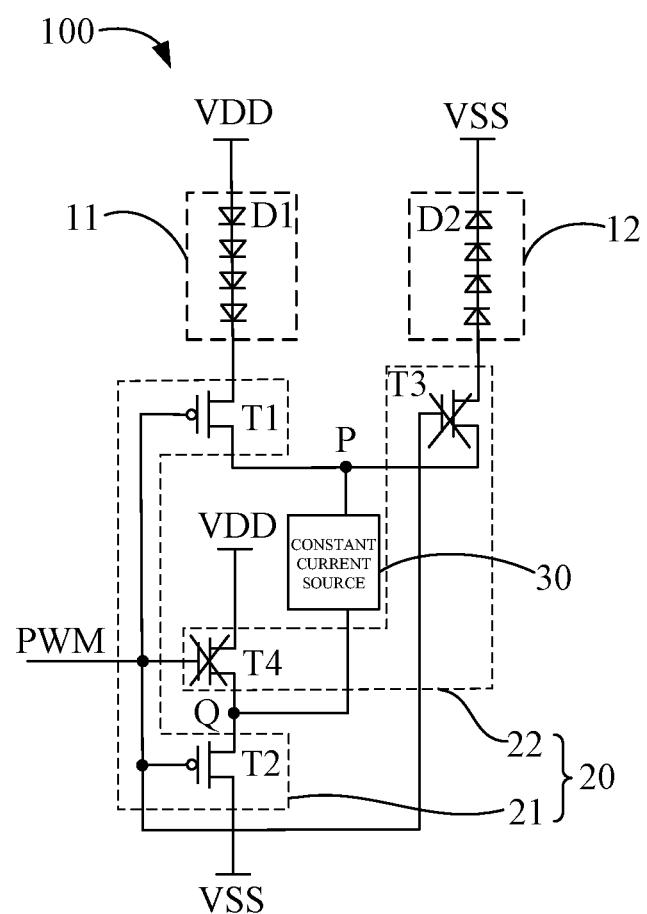
FIG. 5 is a schematic diagram of a path of the backlight driving circuit shown in FIG. 3 in a second light-emitting stage.

Referring to FIG. 5, FIG. 5 is a schematic diagram of a path of the backlight driving circuit shown in FIG. 3 in the second light-emitting stage. In the second light-emitting stage, the control signal PWM is a low level signal, the third transistor T3 and the fourth transistor T4 are turned off, and the second light-emitting unit 12 does not emit light. At this time, the first transistor T1 and the second transistor T2 are turned on. The first power supply signal VDD, the first light-emitting unit 11, the first transistor T1, the constant current source 30, the second transistor T2, and the second power supply signal VSS form a light-emitting path. The first light-emitting unit 11 normally emits light. At this time, an emission time of the first light-emitting unit 11 can be controlled by modulating the duty ratio of the control signal PWM.

Figure 6:
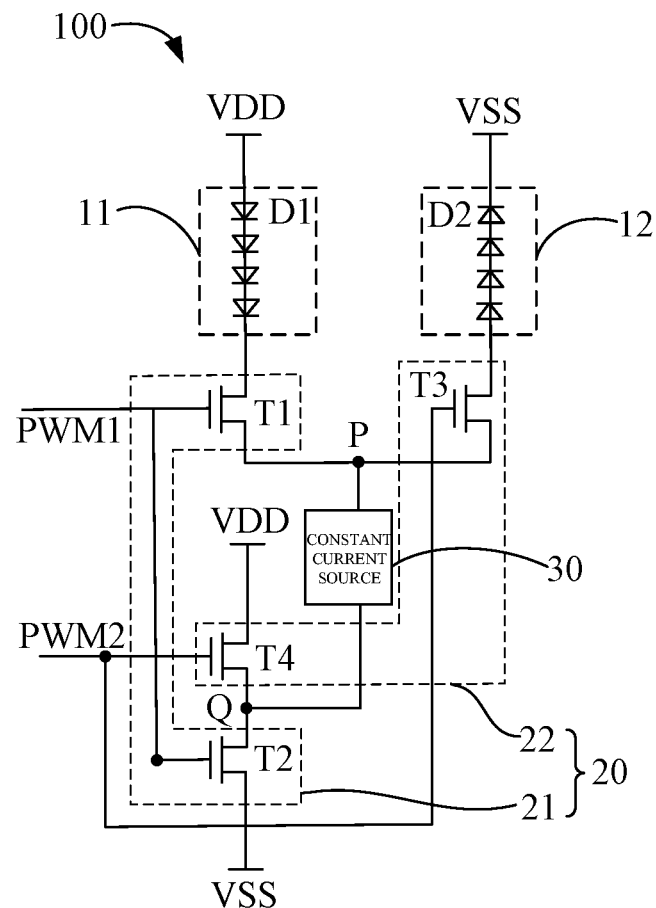
FIG. 6 is a schematic diagram of a second circuit of a backlight driving circuit according to the present disclosure.

Referring to FIG. 6, FIG. 6 is a schematic diagram of a second circuit of a backlight driving circuit according to the present disclosure. The backlight driving circuit 100 is different in that, in this embodiment, the control signal PWM comprises a first control signal PWM1 and a second control signal PWM2. The first light-emitting unit 11 receives the first control signal PWM1. The second light-emitting unit 12 receives the second control signal PWM2.

Wherein the first control signal PWM1 and the second control signal PWM2 are combined such that the driving control timing of the backlight driving circuit 100 comprises the first light-emitting stage and the second light-emitting stage. Specifically, in this embodiment, taking the first transistor T1, the second transistor T2, the third transistor T3, and the fourth transistor T4 all being N-type transistors as an example, but it cannot be understood as a limitation on the present disclosure.

In the first light-emitting stage, the first control signal PWM1 is a low level signal, the first transistor T1 and the second transistor T2 are turned off, and the first light-emitting unit 11 does not emit light. The second control signal PWM2 is a high level signal, and the third transistor T3 and the fourth transistor T4 are turned on. The first power supply signal VDD, the fourth transistor T4, the constant current source 30, the third transistor T3, the second light-emitting unit 12, and the second power supply signal VSS form a light-emitting path. The second light-emitting unit 12 normally emits light. At this time, by modulating a duty ratio of the second control signal PWM2, the emission time of the second light-emitting unit 12 can be controlled.

In the second light-emitting stage, the second control signal PWM2 is a low level signal, the third transistor T3 and the fourth transistor T4 are turned off, and the second light-emitting unit 12 does not emit light. The first control signal PWM1 is a high level signal, and the first transistor T1 and the second transistor T2 are turned on. The first power supply signal VDD, the first light-emitting unit 11, the first transistor T1, the constant current source 30, the second transistor T2, and the second power supply signal VSS form a light-emitting path. The first light-emitting unit 11 normally emits light. At this time, by modulating a duty ratio of the first control signal PWM1, the light emission time of the first light-emitting unit 11 can be controlled.

In this embodiment, a selection of transistor types of the first transistor T1, the second transistor T2, the third transistor T3, and the fourth transistor T4 is made more flexible by providing the first control signal PWM1 to control the first light-emitting control unit 21 and the second control signal PWM2 to control the second light-emitting control unit 22. As long as the first transistor T1 and the second transistor T2 are transistors of a same type, and the third transistor T3 and the fourth transistor T4 are transistors of a same type. For example, the first transistor T1, the second transistor T2, the third transistor T3, and the fourth transistor T4 may all be P-type or N-type transistors. On the one hand, an influence of difference between different types of transistors on the backlight driving circuit 100 can be prevented. On the other hand, a process may be simplified.

Accordingly, the present disclosure further provides a display device. The display device comprises a backlight module and a display panel. The backlight module is configured to provide a backlight to the display panel so that the display panel performs screen display. The backlight module comprises the backlight driving circuit described in any one of the above embodiments. For details, refer to the above contents. In the present disclosure, the display device may be a smartphone, a tablet computer, a video player, a personal computer (PC), or the like, which is not limited in the present disclosure.

Figure 7:
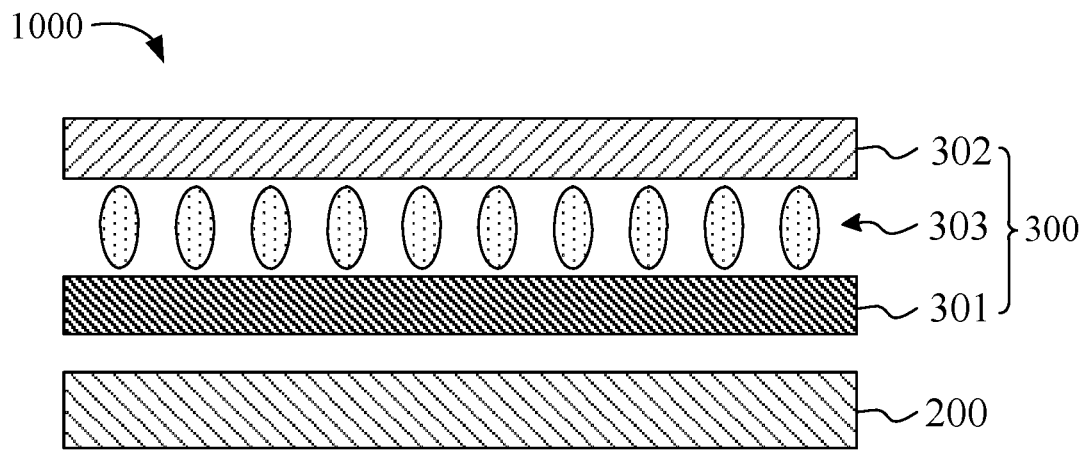
FIG. 7 is a schematic structural diagram of a display device according to the present disclosure.

Specifically, referring to FIG. 7, FIG. 7 is a schematic structural diagram of a display device according to the present disclosure. The display device 1000 comprises a display panel 300 and a backlight module 200. The display panel 300 comprises an array substrate, 301, a color film substrate 302, and a liquid crystal layer 303 disposed between the array substrate 301 and the color film substrate 302. The backlight module 200 is disposed on a side of the array substrate 301 away from the liquid crystal layer 303. The backlight module 200 comprises a backlight driving circuit according to any one of the above embodiments.

In some embodiments of the present disclosure, the backlight module 200 comprises a plurality of light-emitting units (not shown) arranged in an array. It will be understood that in order to solve a tailing problem caused by excessive liquid crystal inversion, the light-emitting units of the backlight module 200 is usually turned on line by line following liquid crystal inversion of the display panel 300. In the embodiment of the present disclosure, since a size of the light-emitting unit is greater than a size of a pixel unit (not shown) in the display panel 300, each row of liquid crystals in the liquid crystal layer 303 corresponds to one row of pixel units in the display panel 300. Therefore, each row of light-emitting units corresponds to a plurality of rows of liquid crystals in the liquid crystal layer 303. Therefore, when the plurality of rows of liquid crystals in the liquid crystal layer 303 are deflected one by one and the deflection is stabilized, a corresponding one row of the light-emitting units in the backlight module 200 emit light.

Figure 8:
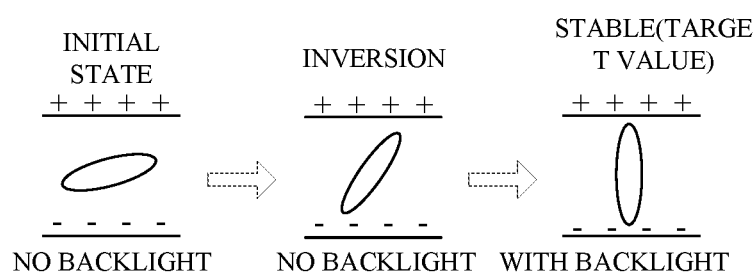
FIG. 8 is a schematic diagram showing a relationship between liquid crystal inversion and backlight module emission in a display device according to the present disclosure.

Specifically, as shown in FIG. 8, corresponding light-emitting units in the backlight module 200 do not emit light in an initial state and in a process in which a plurality of rows of liquid crystals in the liquid crystal layer 303 are inverted. When the plurality of rows of liquid crystals in the liquid crystal layer 303 are deflected row by row and the deflection stably reaches a target value of the inversion, a corresponding one row of the light-emitting units in the backlight module 200 emit light.

That is, in the present disclosure, the light-emitting units in the backlight module 200 emit light row by row. Therefore, two adjacent light-emitting units located in adjacent rows can be driven by the backlight driving circuit described in any one of the above embodiments.

In the display device 1000 provided in the present disclosure, the backlight module 200 comprises a novel backlight driving circuit. In the backlight driving circuit, two light-emitting units located in adjacent rows are controlled by the light-emitting control module to emit light in a time-division manner, so that two light-emitting units can share a same constant current source. While solving the tailing problem caused by excessive liquid crystal transition, the structure of the backlight driving circuit is simplified and the production cost is reduced.

The embodiments of the present disclosure are described in detail above. The principles and embodiments of the present disclosure are described in detail herein. The description of the embodiments is merely intended to help understand the method and core ideas of the present disclosure. At the same time, those ordinary skilled in the art may make changes in the specific embodiments and application scope according to the idea of the present disclosure. In conclusion, the content of the specification should not be construed as a limitation to the present disclosure.

What is claimed is:

1. A backlight driving circuit, comprising:
a light-emitting module comprising a first light-emitting unit and a second light-emitting unit, wherein the first light-emitting unit is connected to a first power supply signal, and the second light-emitting unit is connected to a second power supply signal;
a light-emitting control module, wherein the light-emitting control module is connected to a control signal, the first power supply signal, and the second power supply signal, the light-emitting control module has a first connection terminal and a second connection terminal, the first connection terminal is electrically connected to the first light-emitting unit, the second connection terminal is electrically connected to the second light-emitting unit, and the light-emitting control module is configured to control the first light-emitting unit and the second light-emitting unit to emit light in a time-division manner under control of the control signal, the first power supply signal, and the second power supply signal; and
a constant current source electrically connected to the light-emitting control module, wherein the constant current source is configured to control a constant current flowing through the light-emitting module.

2. The backlight driving circuit according to claim 1, wherein the light-emitting control module comprises a first light-emitting control unit and a second light-emitting control unit;

the first light-emitting control unit is connected to the control signal and the second power supply signal, and is electrically connected to the first connection terminal and the constant current source, and the first light-emitting control unit is configured to control the first light-emitting unit to emit light under control of the control signal and the second power supply signal; and
the second light-emitting control unit is connected to the control signal and the first power supply signal, and is electrically connected to the second connection terminal and the constant current source, and the second light-emitting control unit is configured to control the second light-emitting unit to emit light under control of the control signal and the first power supply signal.

3. The backlight driving circuit according to claim 2, wherein the first light-emitting control unit comprises a first transistor and a second transistor, a gate of the first transistor and a gate of the second transistor are connected to the control signal, one of a source and a drain of the first transistor is electrically connected to the first connection terminal, another one of the source and the drain of the first transistor is electrically connected to a first terminal of the constant current source, one of a source and a drain of the second transistor is electrically connected to a second terminal of the constant current source, and another one of the source and the drain of the second transistor is connected to the second power supply signal.

4. The backlight driving circuit according to claim 3, wherein the second light-emitting control unit comprises a third transistor and a fourth transistor, both a gate of the third transistor and a gate of the fourth transistor are connected to the control signal, one of a source and a drain of the third transistor is electrically connected to the first terminal of the constant current source, another one of the source and the drain of the third transistor is electrically connected to the second connection terminal, one of a source and a drain of the fourth transistor is connected to the first power supply signal, and another one of the source and the drain of the fourth transistor is electrically connected to the second terminal of the constant current source.

5. The backlight driving circuit according to claim 4, wherein the first transistor and the second transistor are P-type transistors, and the third transistor and the fourth transistor are N-type transistors; or the first transistor and the second transistor are N-type transistors, and the third transistor and the fourth transistor are P-type transistors.

6. The backlight driving circuit according to claim 2, wherein the control signal comprises a first control signal and a second control signal; and
the first light-emitting unit is connected to the first control signal, and the second light-emitting unit is connected to the second control signal.

7. The backlight driving circuit according to claim 2, wherein the first transistor, the second transistor, the third transistor, and the fourth transistor are transistors of a same type.

8. The backlight driving circuit according to claim 1, wherein the first light-emitting unit comprises a plurality of first light-emitting devices arranged in series or in parallel; and the second light-emitting unit comprises a plurality of second light-emitting devices arranged in series or in parallel.

9. The backlight driving circuit according to claim 1, wherein the backlight driving circuit comprises a light emitting diode (LED) driving chip, and both the light-emitting control module and the constant current source are integrally disposed within the LED driving chip.

10. The backlight driving circuit according to claim 1, wherein a potential of the first power supply signal is greater than a potential of the second power supply signal.

11. A display device, comprising a backlight module and a display panel, wherein the display panel comprises an array substrate, a color film substrate, and a liquid crystal layer disposed between the array substrate and the color film substrate, the backlight module is disposed on a side of the array substrate away from the liquid crystal layer, the backlight module comprises a backlight driving circuit, and the backlight driving circuit comprises:
  a light-emitting module comprising a first light-emitting unit and a second light-emitting unit, wherein the first light-emitting unit is connected to a first power supply signal, and the second light-emitting unit is connected to a second power supply signal;
  a light-emitting control module, wherein the light-emitting control module is connected to a control signal, the first power supply signal, and the second power supply signal, the light-emitting control module has a first connection terminal and a second connection terminal, the first connection terminal is electrically connected to the first light-emitting unit, the second connection terminal is electrically connected to the second light-emitting unit, and the light-emitting control module is configured to control the first light-emitting unit and the second light-emitting unit to emit light in a time-division manner under control of the control signal, the first power supply signal, and the second power supply signal; and
  a constant current source electrically connected to the light-emitting control module, wherein the constant current source is configured to control a constant current flowing through the light-emitting module.

12. The display device according to claim 11, wherein the backlight module comprises a plurality of light-emitting units arranged in an array, each row of the light-emitting units correspond to a plurality of rows of liquid crystals in the liquid crystal layer, and when the plurality of rows of liquid crystals in the liquid crystal layer are deflected row by row and after the deflection is stable, a corresponding row of light-emitting units in the backlight module emit light.

13. The display device according to claim 12, wherein the backlight driving circuit is configured to drive two adjacent light-emitting units located in adjacent rows to emit light.

14. The display device according to claim 11, wherein the light-emitting control module comprises a first light-emitting control unit and a second light-emitting control unit;
  the first light-emitting control unit is connected to the control signal and the second power supply signal, and is electrically connected to the first connection terminal and the constant current source, and the first light-emitting control unit is configured to control the first light-emitting unit to emit light under control of the control signal and the second power supply signal; and
  the second light-emitting control unit is connected to the control signal and the first power supply signal, and is electrically connected to the second connection terminal and the constant current source, and the second light-emitting control unit is configured to control the second light-emitting unit to emit light under control of the control signal and the first power supply signal.

15. The display device according to claim 14, wherein the first light-emitting control unit comprises a first transistor and a second transistor, a gate of the first transistor and a gate of the second transistor are connected to the control signal, one of a source and a drain of the first transistor is electrically connected to the first connection terminal, another one of the source and the drain of the first transistor is electrically connected to a first terminal of the constant current source, one of a source and a drain of the second transistor is electrically connected to a second terminal of the constant current source, and another one of the source and the drain of the second transistor is connected to the second power supply signal.

16. The display device according to claim 15, wherein the second light-emitting control unit comprises a third transistor and a fourth transistor, both a gate of the third transistor and a gate of the fourth transistor are connected to the control signal, one of a source and a drain of the third transistor is electrically connected to the first terminal of the constant current source, another one of the source and the drain of the third transistor is electrically connected to the second connection terminal, one of a source and a drain of the fourth transistor is connected to the first power supply signal, and another one of the source and the drain of the fourth transistor is electrically connected to the second terminal of the constant current source.

17. The display device according to claim 16, wherein the first transistor and the second transistor are P-type transistors, and the third transistor and the fourth transistor are N-type transistors; or the first transistor and the second transistor are N-type transistors, and the third transistor and the fourth transistor are P-type transistors.

18. The display device according to claim 14, wherein the control signal comprises a first control signal and a second control signal; and
  the first light-emitting unit is connected to the first control signal, and the second light-emitting unit is connected to the second control signal.

19. The display device according to claim 18, wherein the first transistor, the second transistor, the third transistor, and the fourth transistor are transistors of a same type.

20. The display device according to claim 11, wherein the backlight driving circuit comprises a light emitting diode (LED) driving chip, and both the light-emitting control module and the constant current source are integrally disposed within the LED driving chip.

* * * * *